(12) United States Patent
Ueda et al.

(10) Patent No.: US 7,548,372 B2
(45) Date of Patent: Jun. 16, 2009

(54) LIGHT REFLECTOR AND PLANAR LIGHT SOURCE DEVICE

(75) Inventors: Takahiko Ueda, Ibaraki (JP); Hiroshi Koyama, Ibaraki (JP)

(73) Assignee: Yupo Corporation, Tokyo (JP)

( * ) Notice: Subject to any disclaimer, the term of this patent is extended or adjusted under 35 U.S.C. 154(b) by 109 days.

(21) Appl. No.: 11/628,075

(22) PCT Filed: May 31, 2005

(86) PCT No.: PCT/JP2005/010304

§ 371 (c)(1),
(2), (4) Date: Sep. 21, 2007

(87) PCT Pub. No.: WO2005/116699

PCT Pub. Date: Dec. 8, 2005

(65) Prior Publication Data

US 2008/0259473 A1     Oct. 23, 2008

(30) Foreign Application Priority Data

May 31, 2004    (JP) .............................. 2004-161465

(51) Int. Cl.
*G02B 5/02*   (2006.01)
(52) U.S. Cl. .................. 359/599; 362/341; 428/141
(58) Field of Classification Search .................. None
See application file for complete search history.

(56) References Cited

U.S. PATENT DOCUMENTS 5,672,409 A * 9/1997 Miyakawa et al. .......... 428/141

2002/0142133 A1 * 10/2002 Matsunaga et al. .......... 428/141

FOREIGN PATENT DOCUMENTS

| EP | 0 496 323 | 7/1992 |
|---|---|---|
| JP | 4 239540 | 8/1992 |
| JP | 5 43815 | 2/1993 |
| JP | 5 139728 | 6/1993 |
| JP | 6 298957 | 10/1994 |
| JP | 7 300568 | 11/1995 |
| JP | 8 262208 | 10/1996 |
| JP | 10 176079 | 6/1998 |
| JP | 11 256144 | 9/1999 |
| JP | 11 349846 | 12/1999 |
| JP | 2001 158863 | 6/2001 |
| JP | 2002 31704 | 1/2002 |
| JP | 2002 220547 | 8/2002 |
| JP | 2002 363443 | 12/2002 |
| JP | 2003 176367 | 6/2003 |
| JP | 2001 350004 | 12/2004 |
| WO | 03 014778 | 2/2003 |

\* cited by examiner

*Primary Examiner*—Lee Fineman
(74) *Attorney, Agent, or Firm*—Oblon, Spivak, McClelland, Maier & Neustadt, P.C.

(57) ABSTRACT

A light reflector including a laminate film having a light-diffusive layer on one surface of a substrate layer, wherein the surface roughness index of the light-reflective surface is at least 1, the reflectance thereof is at least 95%, and the regular reflectance thereof is at most 3%. The light reflector has higher brightness and higher reflectivity.

14 Claims, 1 Drawing Sheet

US 7,548,372 B2

LIGHT REFLECTOR AND PLANAR LIGHT SOURCE DEVICE

TECHNICAL FIELD

The present invention is useful for a light-reflective member for use in reflecting plates in planar light source devices, reflectors and various lighting instruments, and relates to a light reflector and a planar light source device that comprises the light reflector.

BACKGROUND ART

Backlight-type liquid-crystal displays with a built-in light source therein have been much popularized. Of such backlight-type built-in light sources, a typical structure of an underlight-type backlight comprises a housing 11 that serves both as a profile case and as a light reflector, a diffuser sheet 14, and a light source such as a cold-cathode lamp 15, as in FIG. 2. A typical structure of a sidelight-type backlight comprises a light waveguide with a dot print 12 on a transparent acrylic plate 13, a light reflector 11, a diffuser sheet 14, and a light source such as a cold-cathode lamp 15, as in FIG. 3. In these, the light from the light source is reflected on the light reflector, and forms uniform planar light though the diffuser. Recently, some improvements have been made in these by increasing the power of the lighting source and by increasing the number of the light source lamps therein. For increasing the brightness of these devices with upsizing of displays, plural light sources may be disposed, as in FIG. 2 and FIG. 3.

Heretofore, white polyester films have been much used for the light reflector for the application as herein (e.g., JP-A 4-239540). However, a light reflector that comprises a white polyester film is often problematic in point of its discoloration (yellowing) owing to the recent increase in the quantity of light and to the increase in the ambient temperature by the heat from lamp, and materials that are less discolored have become desired.

Recently, therefore, a light reflector comprising a white polyolefin film has been proposed (e.g., JP-A 6-298957, 2002-31704). In addition, a white polyolefin film has also been proposed, of which the discoloration is smaller than a light reflector comprising a white polyester film (e.g., JP-A 8-262208, 2003-176367). These days, however, there is increasing a demand for further increase in brightness with the tendency toward large-sized displays, and the conventional white polyester films and white polyolefin films are now unsatisfactory. Accordingly, light reflectors having higher brightness and higher reflectivity are desired.

DISCLOSURE OF THE INVENTION

An object of the invention is to provide a light reflector having high reflectivity, which is characterized by its specific structure and has thereby attained an improvement of the brightness thereof not known by anyone till now.

The present inventors have assiduously studied and, as a result, have hit on a laminate film and completed the invention. The laminate film comprises a substrate layer (A) having a function of a light-reflective layer and, provided thereon, a light-diffusive layer (B) having an intrinsic surface roughness and having a function of efficiently diffusing light, in which a light-diffusing capability is imparted to the light reflector surface and the reflectivity of the film is thereby greatly increased, and which is characterized in that its surface roughness index Z is at least 1, its reflectance is at least 95% and its regular reflectance is at most 3%.

The light reflector of the invention comprises the laminate film having a light-diffusive layer (B) on one surface of a substrate layer (A), which is characterized in that the surface roughness index Z, as represented by the following formula (1), of the light-reflective surface of the light reflector is at least 1, that the reflectance R1 thereof at a wavelength of 550 nm is at least 95%, and that the regular reflectance R2 thereof, as represented by the following formula (2), at a wavelength of 550 nm is at most 3%:

Surface roughness index $Z$=(surface area, $Sf$, of light-reflective surface)/(volume, $V$, of the projections of light-reflective surface)  (1)

Regular Reflectance $R2$=(reflectance $R1$)−(diffuse reflectance $R3$)  (2)

wherein R3 is a diffuse reflectance at a wavelength of 550 nm.

Of the laminate film of the invention, the scattering coefficient S, as represented by the following formula (3), is preferably at least 0.5; and the brightness is preferably at least 1430 cd/m². Preferably, the substrate layer (A) contains a thermoplastic resin and a filler, it is stretched in at least one direction, and its areal draw ratio is from 1.3 to 80 times. Preferably, the filler concentration in the substrate layer (A) is from 5 to 75% by weight, and the filler is an inorganic filler having a mean particle size of from 0.05 to 1.5 μm and/or an organic filler having a mean dispersed particle size of from 0.05 to 1.5 μm. Preferably, the filler concentration in the light-diffusive layer (B) is from 5 to 90% by weight, and the filler is an inorganic filler having a mean particle size of from 0.05 to 15 μm and/or an organic filler having a mean dispersed particle size of from 0.05 to 15 μm. In particular, a surface-treated inorganic filter is preferably used.

Scattering Coefficient $S$=$(100 \times R1)/[(100-R1) \times T_A \times P]$  (3)

wherein $T_A$ is the thickness (μm) of the substrate layer (A); P is a porosity (%) represented by the following formula (4).

Porosity $P$=$[(\rho 0-\rho)/\rho 0]$  (4)

wherein ρ0 is the true density of the laminate film, and ρ indicates the density of the substrate layer A.

Preferably, the laminate film has an interlayer (C) on the face of the substrate layer (A) opposite to the face thereof having the light-diffusive layer (B) thereon; preferably, the surface strength of the face opposite to the light-reflective face thereof is at least 250 g; preferably, the surface strength of the light-reflective face thereof is at least 250 g; and preferably the thickness of the light-diffusive layer (B) is from 0.5 to 20 μm.

Preferably, the porosity P of the laminate film is from 15 to 60%; and preferably, the thermoplastic resin is a polyolefin-based resin. The invention further provides a planar light source device comprising the above light reflector.

The light reflector of the invention has high reflectivity and has excellent light diffusibility. The planar light source device produced by the use of the light reflector of the invention has high brightness and is extremely useful.

Figure 1:
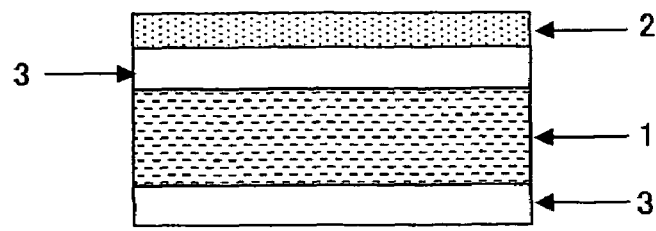
FIG. 1 is an example view of a substrate constitution of a light reflector.

In the drawings, 1 is a substrate layer (A), 2 is a light-diffusive layer (B), 3 is an interlayer (C), 11 is a light reflector (housing), 12 is a dot print, 13 is an acrylic plate, 14 is a diffuser sheet, 15 is a cold-cathode lamp.

DETAILED DESCRIPTION OF THE INVENTION

The constitution and the advantage of the light reflector of the invention are described in detail hereinunder. In the invention, the numerical range expressed by the wording "a number to another number" means the range that falls between the former number indicating the lowermost limit of the range and the latter number indicating the uppermost limit thereof.

[Substrate Layer (A)]

In order to efficiently reflect visible light, the substrate layer (A) having a function of a light-reflective layer preferably contains a large number of pores of which the thickness is controlled to the wavelength size of visible light. The substrate layer (A) preferably contains a thermoplastic resin and a filler.

Thermoplastic Resin

The type of the thermoplastic resin for use in the substrate layer (A) in the invention is not specifically defined. The thermoplastic resin for use in the substrate film (A) may be any thermoplastic resin including ethylenic resins such as high-density polyethylene, middle-density polyethylene, low-density polyethylene; propylenic resins; polyolefin-based resins such as polymethyl-1-pentene, ethylene-cyclic olefin copolymer; polyamide resins such as nylon-6, nylon-6,6, nylon-6,10, nylon-6,12; thermoplastic polyester resins such as polyethylene terephthalate and its copolymer, polyethylene naphthalate, aliphatic polyester; and other thermoplastic resins such as polycarbonate, atactic polystyrene, syndiotactic polystyrene, polyphenylene sulfide. Two or more of these may be mixed for use herein.

Of those, preferred are polyolefin-based resins in view of the chemical resistance and the production cost thereof; and more preferred are propylenic resins.

The propylenic resins include propylene homopolymers, and propylene-based copolymers with α-olefin such as ethylene, 1-butene, 1-hexene, 1-heptene, 4-methyl-1-pentene. The stereospecificity of the resins is not specifically defined. The resins may be isotactic or syndiotactic, and may have any desired degree of stereospecificity. The copolymers may be binary, ternary or quaternary ones, and may be random copolymers or block copolymers.

Preferably, the substrate layer (A) contains from 25 to 95% by weight, more preferably from 30 to 90% by weight of such a thermoplastic resin. The thermoplastic resin content of at least 25% by weight in the substrate layer (A) may prevent surface scratches in stretching and forming the laminate film mentioned below, and the thermoplastic resin content of at most 95% by weight may readily provide a satisfactory degree of porosity of the film.

Filler

For the filler to be in the substrate layer (A) in the invention along with the thermoplastic resin therein, usable are various inorganic fillers or organic fillers.

The inorganic filler includes heavy calcium carbonate, precipitated calcium carbonate, calcined clay, talc, titanium oxide, barium sulfate, aluminum sulfate, silica, zinc oxide, magnesium oxide, diatomaceous earth. In addition, those inorganic fillers processed with various surface-treating agents are also usable herein. Above all, heavy calcium carbonate, precipitated calcium carbonate and their surface-treated products, and clay and diatomaceous earth are preferred as they are inexpensive and facilitate the formation of pores in stretching. More preferred are heavy calcium carbonate and precipitated calcium carbonate that have been processed with various surface-treating agents. Preferred examples of the surface-treating agents are, for example, resin acids, fatty acids, organic acids, sulfuric ester-type anionic surfactants, sulfonic acid-type anionic surfactants, petroleum resin acids, their sodium, potassium or ammonium salts, and their fatty acid esters, resin acid esters, wax and paraffin. Also preferred are nonionic surfactants, dienic polymers, titanate-type coupling agents, silane-type coupling agents, and phosphate-type coupling agents. The sulfuric ester-type anionic surfactants are, for example, long-chain alcohol sulfuric esters, polyoxyethylene alkyl ether sulfuric esters, sulfurized oils, and their sodium or potassium salts. The sulfonic acid-type anionic surfactants are, for example, alkylbenzenesulfonic acids, alkylnaphthalene sulfonic acids, paraffin sulfonic acids, α-olefinsulfonic acids, alkylsulfosuccinic acids, and their sodium or potassium salts. The fatty acids are, for example, caproic acid, caprylic acid, pelargonic acid, capric acid, undecanoic acid, lauric acid, myristic acid, palmitic acid, stearic acid, behenic acid, oleic acid, linolic acid, linolenic acid, eleostearic acid; the organic acids are, for example, maleic acid, sorbic acid; the dienic polymers are, for example, polybutadiene, isoprene; the nonionic surfactants are polyethylene glycol ester-type surfactants. One or more these surface-treating agents may be used herein either singly or as combined.

Methods for processing inorganic fillers with these surface-treating agents are described, for example, in JP-A 5-43815, 5-139728, 7-300568, 10-176079, 11-256144, 11-349846, 2001-158863, 2002-220547, 2002-363443, and these are usable herein.

The organic filler for use herein may have a melting point or a glass transition point (e.g., 120 to 300° C.) higher than the melting point or the glass transition point of the thermoplastic resin. For example, its examples are polyethylene terephthalate, polybutylene terephthalate, polyamide, polycarbonate, polyethylene naphthalate, polystyrene, melamine resin, cyclic olefin homopolymer, copolymer of cyclic olefin and ethylene, polyethylene sulfite, polyimide, polyethyl ether ketone, polyphenylene sulfite. Of those, preferred are immiscible organic fillers having a higher melting point or glass transition temperature than that of the polyolefin resin used for easy pore formation.

One of the inorganic filler or the organic filler may be selected and may be used singly in the substrate layer (A); or two or more may be selected from those fillers and may be combined to be in the substrate layer. In case where two or more fillers are combined and used, then the inorganic filler and the organic filler may be mixed and used.

The mean particle size of the inorganic filler and the mean dispersed particle size of the organic filler may be determined, for example, according to a microtrack method, or through primary particle size observation with a scanning electronic microscope (in the invention, the mean value of the data of 100 particles is the mean particle size), or through specific surface area-based computation (in the invention, the specific surface area is measured with a powder specific area meter, Shimadzu's SS-100).

For suitably controlling the size of the pores to be formed in stretching the laminate film as will be mentioned hereinunder, the mean particle size of the inorganic filler and the mean dispersed particle size of the organic filler each are preferably from 0.05 to 1.5 μm, more preferably from 0.1 to 1 μm. When the filler having a mean particle size or a mean diffused particle size of at most 1.5 µm is used, then uniform pores will be easy to form in the film. When the filler having a mean particle size or a mean dispersed particle size of at least 0.05 µm is used, then predetermined pores will be easy to form in the film.

For suitably controlling the amount of the pores to be formed in stretching the laminate film as will be mentioned hereinunder, the filler content of the stretched film to constitute the substrate layer (A) is preferably from 5 to 75% by weight, more preferably from 10 to 70% by weight. The filler content of at least 5% by weight may readily provide a satisfactory degree of porosity of the film, and the filler content of at most 75% by weight may prevent surface scratches in the film.

Other Ingredients

When the main resin that constitutes the substrate layer (A) is a propylenic resin, then a resin having a lower melting point than that of the propylenic resin, such as polyethylene or ethylene/vinyl acetate may be added thereto in an amount of from 3 to 25% by weight for improving the stretchability of the film.

The substrate layer (A) for use in the invention may have a single-layered structure or a multi-layered structure. The thickness of the substrate layer (A) is preferably from 30 to 1000 µm, more preferably from 40 to 400 µm, even more preferably from 50 to 300 µm.

[Light-Diffusive Layer (B)]

For efficiently reflecting visible light, the light-diffusive layer (B) having a light-diffusing function preferably has many fine projections.

The light-diffusive layer (B) may be formed only on the light-reflective face of the substrate layer (A) or on both faces thereof. The size of the fine projections may be generally from 0.1 to 2.5 µm, preferably from 0.2 to 1.5 µm, more preferably from 0.2 to 1.0 µm, even more preferably the wavelength size of visible light (from 0.38 to 0.78 µm).

Specifically, the inventors have found that, when a light-diffusive layer capable of efficiently diffusing and reflecting visible light is laminated on a conventional light reflector substrate to there by increase the diffuse reflectance at around the surface of the light reflector, then the overall light reflection on the reflector can be basically increased with the result that the light reflector can have a more increased light reflectivity and can have a more increased brightness, and on the basis of these findings, the inventors have completed the invention.

For the light-diffusive layer (B), the same thermoplastic resin and the same filler as those used in the substrate layer (A) may be used. In this, the size of the fine projections of the light-reflective layer (B) may be controlled depending on the particle size of the filler. When the particle size of the filler is nearer to the wavelength of visible light, then the light diffusibility of the layer may increase more. Accordingly, the particle size of the filler is preferably from 0.05 to 1.5 µm, more preferably from 0.1 to 1.0 µm, even more preferably from 0.2 to 0.7 µm. When the particle size of the filler is at least 0.05 µm, then it may facilitate the surface roughness formation and therefore the layer may readily have good light-diffusing capability. When the particle size is at most 1.5 µm, then the surface roughness may be prevented from being larger and therefore the layer may readily keep its good light-diffusing capability. When a higher concentration of the filler is added to the layer within a range within which the layer may keep its surface strength, then the layer may have better light-diffusing capability. The filler concentration is preferably from 5 to 90% by weight, more preferably from 30 to 80% by weight, even more preferably from 45 to 70% by weight. When the filler concentration is at least 5% by weight, then the surface roughness may be more easily formed and the layer may have better light-diffusing capability. When it is at most 90% by weight, then the layer may readily keep its surface strength to a degree not lower than a predetermined level.

The thickness of the light-diffusive layer (B) is preferably from 0.5 to 20 µm, more preferably from 1 to 15 µm, even more preferably from 2 to 6 µm. When the thickness thereof is at least 0.5 µm, then the layer may readily have a sufficient light-diffusing capability and may therefore readily attain a good reflectivity. When it is at most 20 µm, then the layer may hardly detract from the reflecting capability of the substrate layer and may therefore more readily prevent the reduction in the reflectivity of the reflector.

[Laminate Film]

Constitution

The laminate film that constitute the light reflector of the invention may be composed of only the substrate layer (A) and the light-diffusive layer (B), or may additionally have an interlayer (C) and any other suitable material. For example, the light-diffusive layer (B) may be laminated on both faces of the substrate layer (A); or an interlayer (C) may be disposed on the surface of the substrate layer (A) opposite to the surface thereof having the light-diffusive layer (B) thereon, or between the substrate layer (A) and the light-diffusive layer (B). Concretely, examples of the constitution of the laminate film are (B)/(A), (B)/(A)/(B), (B)/(A)/(C), (B)/(C)/(A), (B)/(C)/(A)/(B), (B)/(C)/(A)/(C)/(B).

For the interlayer (C), the same thermoplastic resin as in the substrate layer (A) may be used. In addition, the interlayer (C) may contain the above-mentioned filler, and the amount of the filler there in is preferably from 0 to 20% by weight, more preferably from 0 to 10% by weight, even more preferably from 0 to 5% by weight, still more preferably from 0 to 3% by weight. The thickness of the interlayer (C) is preferably at least 1 µm, more preferably from 2 to 30 µm, even more preferably from 3 to 20 µm. When the thickness thereof is at least 1 µm, then the layer may well enhance the surface strength of the light reflector and may therefore augment the workability thereof.

Additives

If desired, the laminate film of the invention may contain fluorescent brightener, heat stabilizer, light stabilizer, dispersant, lubricant. The heat stabilizer may be a steric-hindered phenol-type, or phosphorus-containing, or amine-type stabilizer, and its content may be from 0.001 to 1% by weight. The light stabilizer may be a steric-hindered amine-type, or benzotriazole-type, or benzophenone-type light stabilizer, and its content may be from 0.001 to 1% by weight. The inorganic filler dispersant may be a silane-coupling agent, a higher fatty acid such as oleic acid or stearic acid, metal soap, polyacrylic acid, polymethacrylic acid or their salt, and its content may be from 0.01 to 4% by weight.

Shaping

For shaping the laminate film, employable is any ordinary monoaxially-stretching or biaxially-stretching method. Concretely, herein employable is a monoaxial-stretching method that comprises sheetwise extruding resin melt(s) through a single-layer or multi-layer T-die or I-die connected to a screw extruder, and then monoaxially stretching the resulting sheet in a mode of machine-direction stretching to be attained by utilizing the peripheral speed difference between multiple rolls; or a biaxial-stretching method that comprises a combination of the same step as in the monoaxial-stretching method and an additional step of cross-direction stretching to be attained in a tenter oven; or a simultaneous biaxial-stretching method to be attained by a combination of a tenter oven and a linear motor.

For forming the laminate film comprising the substrate layer (A) and the light-diffusive layer (B), for example, employable is a method of coextruding a melt material for the light-diffusive layer (B) through a multi-layer T-die or I-die onto the substrate layer (A) before stretching it, and then stretching the resulting laminate; when the substrate layer (A) is a biaxially-stretched one, a method that comprises extruding a melt material for the light-diffusive layer (B) onto the layer (A) that has been monoaxially stretched and sticking it to the latter, and then monoaxially stretching the resulting laminate; or a method that comprises stretching the substrate layer (A), then extruding a resin material for the light-diffusive layer (B) onto the layer and sticking it thereto directly or via an adhesive layer therebetween. When the interlayer (C) is formed, then the same may apply thereto.

The stretching temperature may be lower by 2 to 60° C. than the melting point of the thermoplastic resin used, but is higher by 2 to 60° C. than the glass transition point of the resin. When the resin is propylene homopolymer (melting point, 155 to 167° C.), then the stretching temperature preferably falls between 95 and 165° C. When the resin is polyethylene terephthalate (glass transition point: about 70° C.), then the stretching temperature preferably falls between 100 and 130° C. The pulling rate for the stretching preferably falls between 20 and 350 m/min.

The obtained laminate film may be optionally heat-treated (annealed) for promoting the crystallization thereof and for reducing the thermal shrinkage of the laminate film.

For suitably controlling the size of the pores to be formed in the laminate film, the areal draw ratio of the substrate layer (A) preferably falls between 1.3 and 80 times, more preferably between 7 and 70 times, even more preferably between 22 and 65 times, most preferably between 25 and 60 times. The areal draw ratio falling between 1.3 and 80 times readily forms fine pores in the film, not lowering the reflectivity of the film.

For suitably controlling the amount of the pores to be formed in the laminate film of the invention, per a unit volume of the film, the degree of porosity of the film is preferably from 15 to 60%, more preferably from 20 to 55%. The "porosity" as referred to herein is meant to indicate the value calculated according to the above-mentioned formula (4). In formula (4), $\rho_0$ indicates the true density, and p indicates the density (JIS P-8118). So far as the unstretched material does not contain much air, the true density is nearly equal to the density of the unstretched film.

The density of the laminate film for use in the invention generally falls between 0.5 and 1.2 g/cm$^3$. Films having more pores have a smaller density and have a larger porosity. Films having a larger porosity may have improved surface-reflecting characteristics.

[Light Reflector]

The light reflector of the invention comprises the above-mentioned laminate film. The surface roughness index, Z, of the light reflector of the invention is at least 1, preferably from 1 to 1000, more preferably from 2 to 100, even more preferably from 3 to 10. The surface roughness index Z indicates the degree of surface projections, and it is proportional to the number of fine projections per a unit area of the light reflector. When the surface roughness Z is less than 1, then it is unfavorable since the regular reflectance tends to be high and the reflectivity tends to lower and since the brightness in planar light source devices lowers. In order to make the surface roughness index, Z, at least 1 and to make the regular reflectance, R2, at most 3%, for example, employable is a method of adding an inorganic filler and/or an organic filler to the light-diffusive layer (B) to thereby make the surface have fine projections of the filler, or a method of embossing the surface with a embossing roll, as the light reflector may readily have the intended microstructure and its producibility is good. Especially preferred is a method adding a filler of which the particle size is near to the wavelength size (0.38 to 0.78 µm) of visible light to the light-diffusive layer (B) and stretching the film.

The reflectance, R1, measured at a wavelength of 550 nm is at least 95%, preferably at least 97%, more preferably from 98% to 100%. The regular reflectance, R2, is at most 3%, preferably at most 2.5%, more preferably from 0% to 2%. When the reflectance is less than 95%, then it is unfavorable since the brightness in planar light source devices is low. When the regular reflectance, R2 is more than 3%, it is also unfavorable since the reflectance R1 tends to lower and the brightness in planar light source devices is low. In order to make the reflectance, R1, at least 95%, for example, employable is a method of adding a filler of which the particle size is near to the wavelength size (0.38 to 0.78 µm) of visible light to the substrate layer (A) and then stretching the film to thereby form a large number of pores having a thickness near to the wavelength size of visible light, or a method of adding a high-concentration filler with a high refractive index, of which the particle size is near to the wavelength size of visible light, to the substrate layer (A), as the light reflector may readily have the intended microstructure and its producibility is good.

The light reflector of the invention has a scattering coefficient S, as defined by formula (3), of at least 0.5, preferably from 0.6 to 100, more preferably from 0.8 to 50. The scattering coefficient, S, means a degree of light scattering per a unit volume of pores, and is proportional to R1 and inversely proportional to the thickness $T_A$ and the porosity P of the substrate layer (A). According to the invention, a number of flat pores that are finer and have a more uniform size may be formed in the substrate layer (A), and therefore the light reflector can have the intended brightness not requiring any unnecessary increase in the thickness of the substrate layer (A).

The brightness of the light reflector may be determined according to the method mentioned hereinunder. The brightness of the light reflector of the invention is preferably at least 1430 cd/m$^2$, more preferably at least 1450 cd/m$^2$, even more preferably from 1460 cd/m$^2$ to 3000 cd/m$^2$, still more preferably from 1470 cd/m$^2$ to 2000 cd/m$^2$.

Of the light reflector of the invention, the surface strength of the face (non-reflecting face) opposite to the light-reflective face thereof is at least 250 g, preferably from 270 to 1000 g. The surface strength of the light-reflective face of the light reflector is preferably at least 250 g, more preferably from 270 to 1000 g. When the surface strength is less than 250 g, the surface of the light reflector may be readily scratched when it is handled thereby often causing a problem of surface fracture, etc.

The surface strength as referred to in this description means the peeling load that is determined by sticking an adhesive tape having a width of 18 mm to the test surface of the light reflector and peeling it at a speed of 300 mm/min, as shown by the determination method mentioned below. The light reflector of the invention having a surface strength of at least 250 g is free from a problem of loosing or peeling thereof when it is stuck to a tabular material and shaped and worked variously.

The shape of the light reflector of the invention is not specifically defined, and may be suitably determined in accordance with the use, the object and the service condition thereof. In general, it is used as a plate or film, but may be used in any other form capable of serving as a light reflector, and any and every form that serves as a light reflector falls within the scope of the invention.

[Planar Light Source Device]

Figure 2:
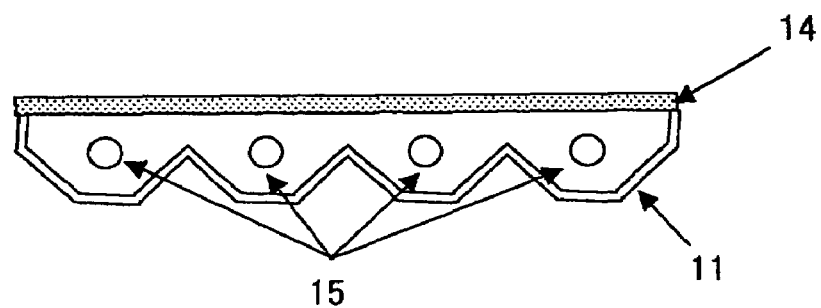
FIG. 2 is a cross-sectional view showing a constitution of an underlight-type backlight.

The light reflector of the invention may be built in a planar light source device. The concrete structure of the planar light source device of the invention is not specifically defined. One typical structure of the planar light source device comprises at least a light source, a light waveguide and a light reflector, and preferably has a diffuser sheet. For example, there are mentioned an underlight-type backlight as in FIG. 2, and a sidelight-type backlight as in FIG. 3. In particular, the light reflector of the invention is extremely useful as that for constituting a sidelight-type backlight. In the sidelight-type backlight that comprises the light reflector of the invention, the light having passed through the light waveguide may be uniformly reflected by the light reflector therein with no trouble of uneven brightness in the plane direction of the device. Accordingly, the backlight device of the type gives light of a natural feel to viewers.

The planar light source device of the invention may be effectively disposed in liquid-crystal displays, etc. When used in liquid-crystal displays, it ensures good image quality and brightness for a long period of time.

[Other Applications]

The light reflector of the invention may be used not only in such planar light source devices as above but also in any other power-saving display devices which are not equipped with a built-in light source and in which room light is intended to reflect on the light reflector. In addition, it may be widely utilized for the back of indoor or outdoor lighting devices and for the back of decorative illumination signboards.

The invention is described more concretely with reference to the following Examples, Comparative Examples and Test Examples. The material, its amount and ratio and the operation mentioned below may be suitably changed and modified not overstepping the sprit and the scope of the invention. Accordingly, the scope of the invention should not be limited to the Examples mentioned below. The materials used in the Examples are shown in Table 1 mentioned below.

TABLE 1

| Ingredient | Details |
|---|---|
| PP1 | propylene homopolymer [Nippon Polychem's Novatec PP:EA8] (MFR (230° C., 2.16 kg load) = 0.8 g/10 min), melting point (167° C., DSC peak temperature) |
| PP2 | propylene homopolymer [Nippon Polychem's Novatec PP:MA4] (MFR (230° C., 2.16 kg load) = 5 g/10 min), melting point (167° C., DSC peak temperature) |
| HDPE | high-density polyethylene [Nippon Ethylene's Novatec HD:HJ360] (MFR (190° C., 2.16 kg load) = 5.5 g/10 min), melting point (134° C., DSC peak temperature) |
| Heavy Calcium Carbonate (a) | precipitated calcium carbonate having a mean particle size of 0.15 μm and surface-treated with fatty acid [Maruo Calcium's MSK-PO] |
| Heavy Calcium Carbonate (b) | precipitated calcium carbonate having a mean particle size of 0.3 μm [Maruo Calcium's Calfine YM30] |
| Heavy Calcium Carbonate (c) | heavy calcium carbonate having a mean particle size of 1.8 μm [Bihoku Funka Kogyo's Softon 1800] |

TABLE 1-continued

| Ingredient | Details |
|---|---|
| Titanium Dioxide | titanium dioxide having a mean particle size of 0.2 μm [Ishihara Sangyo's CR-60] |

EXAMPLE 1

A composition (A), a composition (B) and a composition (C) prepared by mixing the ingredients shown in Table 1 in the ratio shown in Table 2 were separately melt-kneaded in different extruders at 250° C. Next, these were fed to one co-extrusion die, in which (B) was laminated on the surface of (A) and (C) was on the back of (A), and sheetwise extruded out and cooled to about 60° C. with a chill roll to obtain a laminate of B/A/C.

The laminate was re-heated at 145° C., then stretched in the machine direction thereof by utilizing the peripheral speed difference between a number of rolls, again re-heated up to about 150° C., and stretched in the cross direction thereof in a tenter. Then, the laminate was re-heated at 160° C. and stretched in the cross direction thereof in a tenter. Next, this was annealed at 160° C. and then cooled to 60° C., and its edges were trimmed away to give a three-layered laminate film. The laminate film is used as a light reflector.

EXAMPLE 2

A composition (A) prepared by mixing the ingredients shown in Table 1 in the ratio shown in Table 2 was melt-kneaded in an extruder at 250° C. Then, this was sheetwise extruded out, and cooled to about 60° C. with a chill roll to obtain a substrate layer (A). The substrate layer (A) was re-heated at 145° C., and then stretched in the machine direction to the draw ratio as in Table 2, by utilizing the peripheral speed difference between a number of rolls.

Compositions (B) and (C) prepared by mixing the ingredients shown in Table 1 in the ratio shown in Table 2 were melt-kneaded, and extruded out onto both faces of the substrate layer (A) to form a light-diffusive layer (B) and an interlayer (C) thereon, thereby giving a laminate of B/C/A/C. Then, the laminate was re-heated at 160° C. and stretched in the cross direction to the draw ratio as in Table 2, in a tenter. Next, this was annealed at 160° C. and then cooled to 60° C., and its edges were trimmed away to give a four-layered laminate film having a thickness as in Table 2 (FIG. 1). The laminate film is used as a light reflector.

EXAMPLE 3

A light reflector was obtained in the same manner as in Example 2, for which, however, the ingredients in Table 1 were mixed in the ratio as in Table 2.

COMPARATIVE EXAMPLE 1

A composition (A) prepared by mixing the ingredients shown in Table 1 in the ratio as in Table 2 was melt-kneaded in an extruder at 250° C. Then, this was sheetwise extruded out, and cooled to about 60° C. with a chill roll to obtain a substrate layer (A). The substrate layer (A) was re-heated at 145° C., and then stretched in the machine direction to the draw ratio as in Table 2, by utilizing the peripheral speed difference between a number of rolls.

A composition (C) prepared by mixing the ingredients shown in Table 1 in the ratio shown in Table 2 was melt-kneaded, and extruded out onto both faces of the substrate layer (A) to an interlayer (C) thereon, thereby giving a laminate of C/A/C. Then, the laminate was re-heated at 160° C. and stretched in the cross direction to the draw ratio as in Table 2, in a tenter. Next, this was annealed at 160° C. and then cooled to 60° C., and its edges were trimmed away to give a three-layered laminate film having a thickness as in Table 2. The laminate film is used as a light reflector.

COMPARATIVE EXAMPLE 2

A sample of Example 5 in JP-A 2002-031704 is used as a light reflector.

(Test Methods)

The light reflectors of Examples 1 to 5 and Comparative Examples 1 and 2 were tested as follows:

1) Surface area Sf of light-reflective face, and volume V of projections:

Using a microscope for ultra-deep 3-dimensional profile analysis (VK8510, by Keyence), the light-reflective face of the light reflector is analyzed at a magnification power of 2000. The surface area of the light-reflective face is represented by Sf, and the volume of the projections of the face is by V.

2) Reflectance R1:

Measured according to the method described in JIS-Z8722, condition d, the reflectance at a wavelength of 550 nm is represented by R1.

3) Diffuse reflectance R3:

According to the method described in JIS Z-8722, condition d, and using a light trap, the regular reflection component of the light reflector is cut off, and the reflectance at a wavelength of 550 nm is referred to as a diffuse reflectance R3.

Figure 3:
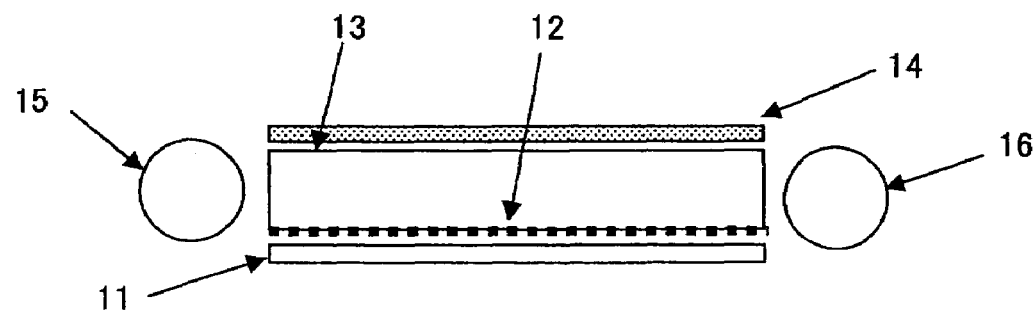
FIG. 3 is a cross-sectional view showing a constitution of a sidelight-type backlight.

Brightness:

The light reflector is set at the position 11 of the 14-inches-size planar light source device illustrated in FIG. 3, and an inverter unit by Harrison is connected to the cold-cathode lamp 15. A tubular current of 6 mA at 12 V is applied to the cold-cathode lamp 15, and the device is switched on for lighting. After 3 hours, this is evaluated in the following matter. A brightness meter by Topcon (trade name, BM-7) is used for measuring the brightness. The distance between the part at which the brightness is determined and the planar light source device relative to the normal line direction of the planar light source device is 50 cm. The brightness is measured at 9 points in all, and the data are averaged.

4) Surface Strength:

An adhesive tape (by Nichiban, trade name; Cellotape™) having a width of 18 mm is airtightly stuck to the test surface of the light reflector to a length of at least 100 mm, and the last 10 mm of the tape is left as such not stuck to it. The sample is cut into a piece having a width of 20 mm. A tensile tester (by Orientec, trade name: RTM-250) with a load cell of 5 kg is used. The chuck-to-chuck distance is 1 cm. The non-stuck part of the adhesive tape and a part of the light reflector with no adhesive tape stuck thereto are separately sandwiched between the upper and lower chucks. This is pulled at a speed of 300 mm/min, and the load in the stable part of the chart is read. Each sample is tested three times, and the data are averaged to obtain the surface strength of the light reflector.

5) Workability:

The light reflector obtained in Examples and Comparative Examples is dry-laminated on a stainless plate (SUS #5052, thickness 0.6 mm), using an adhesive (by Toyo Morton, trade name: TM590) and a curing agent (by Toyo Morton, trade name: CAT56) to prepare a sample. Using a pressing machine, the sample is folded twice, each at an angle of 90° in the opposite directions in such a manner that the light reflector side could form a valley and a mountain. The light reflector is evaluated as follows:

O: The light reflector did neither loose nor peel from the stainless plate.

x: The light reflector loosed or peeled from the stainless plate.

The test results are shown in Table 2 and Table 3.

TABLE 2

| | Composition (wt. %) of Substrate Layer (A) | | | | Composition (wt. %) of Light-Diffusive Layer (B) | | | | Composition (wt. %) of Protective Layer (B') | | | | Composition (wt. %) of Interlayer (C) | | | |
|---|---|---|---|---|---|---|---|---|---|---|---|---|---|---|---|---|
| | PP1 | HDPE | CaCO₃ | TiO₂ | PP2 | HDPE | CaCO₃ | TiO₂ | PP2 | HDPE | CaCO₃ | TiO₂ | PP2 | HDPE | CaCO₃ | TiO₂ |
| Example 1 | 51 | 4 | 40(b) | 5 | 40 | — | 59(b) | 1 | — | — | — | — | 97 | — | 3(c) | — |
| Example 2 | 51 | 4 | 40(b) | 5 | 40 | — | 59(b) | 1 | — | — | — | — | 100 | — | — | — |
| Example 3 | 51 | 4 | 40(a) | 5 | 40 | — | 59(b) | 1 | — | — | — | — | 100 | — | — | — |
| Comparative Example 1 | 61 | 4 | 30(b) | 5 | — | — | — | — | — | — | — | — | 100 | — | — | — |
| Comparative Example 2 | 75 | 10 | 15(c) | — | — | — | — | — | 55 | — | 45(c) | — | 97 | — | 3(c) | — |

| | Layer Thickness (μm) | Layer Constitution | Draw Ratio in Stretching | | Areal Draw Ratio MD*CD |
|---|---|---|---|---|---|
| | | | machine direction (MD) | cross direction (CD) | |
| Example 1 | 2/198/4 | B/A/C | 4.5 | 8.5 | 38.3 |
| Example 2 | 3/10/200/13 | B/C/A/C | 4.5 | 8.5 | 38.3 |
| Example 3 | 3/10/200/13 | B/C/A/C | 4.5 | 8.5 | 38.3 |
| Comparative Example 1 | 13/150/13 | C/A/C | 3.8 | 9.0 | 34.2 |
| Comparative Example 2 | 40/1/118/1/40 | B'/C/A/C/B' | 5.0 | 7.5 | 37.5 |

TABLE 3

| | Surface Area Sf (μm²) | Volume of Projections V (μm³) | Surface Roughness Index Z <Sf/V> | 550 nm Reflectance R1 (%) | 550 nm Diffuse Reflectance R3 (%) | 550 nm Regular Reflectance R2 <R1-R3> (%) |
|---|---|---|---|---|---|---|
| Example 1 | 14600 | 6300 | 2.3 | 98.8 | 97.2 | 1.6 |
| Example 2 | 26100 | 5000 | 5.2 | 99.3 | 97.0 | 2.3 |
| Example 3 | 26100 | 5000 | 5.2 | 99.5 | 99.4 | 0.1 |
| Comparative Example 1 | 5200 | 6100 | 0.9 | 97.1 | 91.1 | 6.0 |
| Comparative Example 2 | 15589 | 5450 | 2.9 | 93.8 | 93.2 | 0.6 |

| | 550 nm Scattering Coefficient S | Brightness (cd/m²) | Porosity (%) | Surface Strength | | Workability |
|---|---|---|---|---|---|---|
| | | | | Light-reflective Face (g) | Non-Reflecting Face (g) | Non-Reflecting Face |
| Example 1 | 0.90 | 1450 | 46 | 90 | 530 | ○ |
| Example 2 | 1.54 | 1490 | 46 | 550 | 600 | ○ |
| Example 3 | 2.16 | 1500 | 46 | 550 | 600 | ○ |
| Comparative Example 1 | 0.49 | 1380 | 46 | 600 | 600 | ○ |
| Comparative Example 2 | 0.41 | 1220 | 31 | 200 | 200 | x |

The invention claimed is:

1. A light reflector which comprises a laminate film having a light-diffusive layer (B) on one surface of a substrate layer (A), wherein the surface roughness index Z, as represented by the following formula (1), of the light-reflective surface of the light reflector is at least 1, the reflectance R1 thereof at a wavelength of 550 nm is at least 95%, and the regular reflectance R2 thereof, as represented by the following formula (2), at a wavelength of 550 nm is at most 3%:

Surface roughness index $Z$=(surface area, $Sf$, of light-reflective surface)/(volume, $V$, of the projections of light-reflective surface)    (1)

Regular Reflectance $R2$ =(reflectance $R1$)–(diffuse reflectance $R3$)    (2)

wherein R3 is a diffuse reflectance at a wavelength of 550 nm.

2. The light reflector as claimed in claim 1, wherein the scattering coefficient S, as represented by the following formula (3), of the light-reflective surface is at least 0.5:

Scattering Coefficient $S$=(100×$R1$)/[(100–$R1$)×$T_A$×$P$]    (3)

wherein $T_A$ is the thickness (μm) of the substrate layer (A); P is a porosity (%), represented by the following formula (4) of the laminate film, Porosity $P$=[(ρ0–ρ)/ρ0]×100    (4)

wherein ρ0 is the true density of the laminate film; ρ indicates the density of the substrate layer A.

3. The light reflector as claimed in claim 1, which has a brightness of at least 1430 cd/m².

4. The light reflector as claimed in claim 1, wherein the substrate layer (A) contains a thermoplastic resin and a filler, it is stretched in at least one direction, and its areal draw ratio is from 1.3 to 80 times.

5. The light reflector as claimed in claim 1, wherein the substrate layer (A) contains an inorganic filler having a mean particle size of from 0.05 to 1.5 μm and/or an organic filler having a mean dispersed particle size of from 0.05 to 1.5 μm, and the filler concentration in the substrate layer (A) is from 5 to 75% by weight.

6. The light reflector as claimed in claim 1, wherein the light-diffusive layer (B) contains an inorganic filler having a mean particle size of from 0.05 to 15 μm and/or an organic filler having a mean dispersed particle size of from 0.05 to 15 μm, and the filler concentration in the light-diffusive layer (B) is from 5 to 90% by weight.

7. The light reflector as claimed in claim 1, wherein the substrate layer (A) and/or the light-diffusive layer (B) contain(s) a surface-treated inorganic filler.

8. The light reflector as claimed in claim 1, wherein the laminate film has an interlayer (C) on the face of the substrate layer (A) opposite to the face thereof having the light-diffusive layer (B) thereon.

9. The light reflector as claimed in claim 1, wherein the surface strength of the face opposite to the light-reflective face of the laminate film is at least 250 g.

10. The light reflector as claimed in claim 1, wherein the surface strength of the light-reflective face of the laminate film is at least 250 g.

11. The light reflector as claimed in claim 1, wherein the thickness of the light-diffusive layer (B) is from 0.5 to 20 μm.

12. The light reflector as claimed in claim 1, wherein the porosity P of the laminate film is from 15 to 60%.

13. The light reflector as claimed in claim 4, wherein the thermoplastic resin is a polyolefin-based resin.

14. A planar light source device comprising a light reflector of claim 1.

* * * * *